United States Patent
Wei et al.

(10) Patent No.: US 10,057,136 B2
(45) Date of Patent: Aug. 21, 2018

(54) METHOD AND APPARATUS FOR VISUALIZED NETWORK OPERATION AND MAINTENANCE

(71) Applicant: Huawei Technologies Co., Ltd., Shenzhen (CN)

(72) Inventors: Hanyu Wei, Nanjing (CN); Youqing Yang, Nanjing (CN); Xingfen Wu, Nanjing (CN); Jinhui Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 15/222,654

(22) Filed: Jul. 28, 2016

(65) Prior Publication Data

US 2016/0337200 A1  Nov. 17, 2016

Related U.S. Application Data

(63) Continuation of application No. PCT/CN2014/095762, filed on Dec. 31, 2014.

(30) Foreign Application Priority Data

Jan. 29, 2014  (CN) .......................... 2014 1 0043077

(51) Int. Cl.
  *G06F 15/173* (2006.01)
  *H04L 12/24* (2006.01)

(52) U.S. Cl.
  CPC ............ *H04L 41/145* (2013.01); *H04L 41/22* (2013.01)

(58) Field of Classification Search
  CPC ............................. H04L 41/145; H04L 41/22
  USPC .................................................. 709/223, 224
  See application file for complete search history.

(56) References Cited

U.S. PATENT DOCUMENTS

| | | | | |
|---|---|---|---|---|
| 6,233,449 | B1* | 5/2001 | Glitho | H04Q 3/0075 455/423 |
| 6,445,774 | B1* | 9/2002 | Kidder | H04M 3/10 379/14.01 |
| 7,822,062 | B2* | 10/2010 | Moran | H04L 41/0253 370/466 |
| 8,355,316 | B1 | 1/2013 | Lushear et al. | |
| 8,468,228 | B2* | 6/2013 | Covino | H04L 41/042 709/223 |

(Continued)

FOREIGN PATENT DOCUMENTS

| CN | 1859239 A | 11/2006 |
|---|---|---|
| CN | 101867490 A | 10/2010 |

(Continued)

*Primary Examiner* — Philip B Tran
(74) *Attorney, Agent, or Firm* — Slater Matsil, LLP

(57) ABSTRACT

This application discloses a method for visualized network operation and maintenance, including receiving a request for visualized network operation and maintenance, generating a workflow for visualized network operation and maintenance according to the request for visualized network operation and maintenance, and creating a network modeling input, and performing, according to the workflow for visualized network operation and maintenance, the network modeling input, and original information of network modeling, analog simulation on a network determined by the network modeling input.

18 Claims, 6 Drawing Sheets

(56) References Cited

U.S. PATENT DOCUMENTS

| | | | | |
|---|---|---|---|---|
| 2003/0046329 A1* | 3/2003 | Sasabe | ............... | H04L 41/0253 |
| | | | | 709/201 |
| 2006/0025984 A1 | 2/2006 | Papaefstathiou et al. | | |
| 2006/0250964 A1 | 11/2006 | Vasseur et al. | | |
| 2008/0219171 A1* | 9/2008 | Gopalakrishna | .......... | H04J 3/14 |
| | | | | 370/241.1 |
| 2008/0294418 A1* | 11/2008 | Cleary | ............... | H04L 41/0803 |
| | | | | 703/21 |
| 2011/0122776 A1 | 5/2011 | Jacob et al. | | |
| 2011/0246669 A1 | 10/2011 | Kanada et al. | | |
| 2012/0069741 A1* | 3/2012 | You | .................... | H04L 43/0811 |
| | | | | 370/241.1 |
| 2014/0098677 A1* | 4/2014 | Otung | .................. | H04L 41/145 |
| | | | | 370/242 |

FOREIGN PATENT DOCUMENTS

| | | |
|---|---|---|
| CN | 103051473 A | 4/2013 |
| CN | 103532780 A | 1/2014 |
| EP | 1624397 A1 | 2/2006 |
| JP | 2006048703 A | 2/2006 |

\* cited by examiner

METHOD AND APPARATUS FOR VISUALIZED NETWORK OPERATION AND MAINTENANCE

CROSS-REFERENCE TO RELATED APPLICATIONS

This application is a continuation of International Application No. PCT/CN2014/095762, filed on Dec. 31, 2014, which claims priority to Chinese Patent Application No. 201410043077.7, filed on Jan. 29, 2014, both of which are hereby incorporated by reference in their entireties.

TECHNICAL FIELD

The present invention relates to the field of communications technologies, and in particular, to a method and an apparatus for visualized network operation and maintenance.

BACKGROUND

An Internet service provider (ISP) bearer network is usually a complex network including various types of devices from different vendors. A corresponding Network Management System (NMS) emerges accordingly. The NMS is generally provided by a device vendor, and can perform basic device configuration, management, and maintenance for a covered network. With development of the Internet, the bearer network becomes increasingly large and complex. An operation and maintenance apparatus at an early stage such as an NMS is limited to basic device management and fault alarm, which cannot meet a requirement for highly efficient operation and maintenance of a network. Particularly, the Internet Protocol (IP) is widely applied in the entire network, and dynamic routing is introduced in an IP network. Being different from a layer 2 network, a layer 3 network is more like a network cloud in which a black box phenomenon occurs, and an operator does not have an accurate, dynamic, and comprehensive understanding of the entire IP network.

For visualized network operation and maintenance in the prior art, both path visualization and fault location depend on a probe, accuracy of a measurement capability depends on network coverage of the probe, and a large scale of probe deployment causes relatively high costs.

SUMMARY

To implement visualized network operation and maintenance without depending on a probe, embodiments provide a method and an apparatus for visualized network operation and maintenance.

According to a first aspect, a method for visualized network operation and maintenance is provided, including receiving a request for visualized network operation and maintenance and generating a workflow for visualized network operation and maintenance according to the request for visualized network operation and maintenance, and creating a network modeling input. The method also includes performing, according to the workflow for visualized network operation and maintenance, the network modeling input, and original information of network modeling, analog simulation on a network determined by the network modeling input.

With reference to the first aspect, in a first possible implementation manner, the original information of the network modeling includes configuration information, acquired from an NMS, of a network element device in a region for visualized network operation and maintenance and includes status information acquired from the network element device in the region for visualized network operation and maintenance.

With reference to the first aspect, in a second possible implementation manner, the request for visualized network operation and maintenance is a path visualization request, and the path visualization request includes path source and destination address information; and the generating a workflow for visualized network operation and maintenance according to the request for visualized network operation and maintenance, and creating a network modeling input includes: generating, according to the path source and destination address information, a workflow file for visualized network operation and maintenance or a message flow based on a specified protocol, where the workflow file or the message flow includes a path query constraint input; and creating the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

With reference to the first aspect and the second possible implementation manner of the first aspect, in a third possible implementation manner, the performing, according to the workflow for visualized network operation and maintenance, the network modeling input, and original information of network modeling, analog simulation on a network determined by the network modeling input includes: analyzing a service test requirement according to the path query constraint input to obtain a simulation input, and generating service test simulation information; simulating a service test data flow according to the service test simulation information; selecting a modeling algorithm according to the network modeling input and the original information of the network modeling, and constructing an algorithm package and an input data set; generating a network model according to the algorithm package and the input data set; and performing a forwarding test on the simulated service test data flow on the network model.

With reference to the first aspect, in a fourth possible implementation manner, the request for visualized network operation and maintenance is a fault location request, and the fault location request includes faulty service description information and faulty network description information; and the generating a workflow for visualized network operation and maintenance according to the request for visualized network operation and maintenance, and creating a network modeling input includes: generating, according to the faulty service description information and the faulty network description information, a workflow file for visualized network operation and maintenance or a message flow based on a specified protocol, where the workflow file or the message flow includes a path query constraint input; and creating the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

With reference to the first aspect and the fourth possible implementation manner of the first aspect, in a fifth possible implementation manner, the performing, according to the workflow for visualized network operation and maintenance, the network modeling input, and original information of network modeling, analog simulation on a network determined by the network modeling input includes: selecting a modeling algorithm according to the network modeling input and the original information of the network modeling, and constructing an algorithm package and an input data set; generating a network model according to the algorithm package and the input data set; and extracting, according to the path query constraint input, a device included in a specified network or a specified path and an event associated with the device, and screening and rating the event, to form an event report.

According to a second aspect, an apparatus for visualized network operation and maintenance is provided, including a transceiver module, configured to receive a request for visualized network operation and maintenance and a generating and creating module, configured to generate a workflow for visualized network operation and maintenance according to the request for visualized network operation and maintenance, and create a network modeling input. The apparatus also includes an analog simulation module, configured to perform, according to the workflow for visualized network operation and maintenance, the network modeling input, and original information of network modeling, analog simulation on a network determined by the network modeling input.

With reference to the second aspect, in a first possible implementation manner, the apparatus further includes an acquiring module, configured to acquire, from an NMS, configuration information of a network element device in a region for visualized network operation and maintenance and acquire status information from the network element device in the region for visualized network operation and maintenance, to form the original information of the network modeling.

With reference to the second aspect, in a second possible implementation manner, the request for visualized network operation and maintenance is a path visualization request, and the path visualization request includes path source and destination address information; and the generating and creating module is specifically configured to generate, according to the path source and destination address information, a workflow file for visualized network operation and maintenance or a message flow based on a specified protocol, where the workflow file or the message flow includes a path query constraint input, and is specifically configured to create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

With reference to the second aspect and the second implementation manner of the second aspect, in a third possible implementation manner, the analog simulation module is specifically configured to analyze a service test requirement according to the path query constraint input to obtain a simulation input, and generate service test simulation information; simulate a service test data flow according to the service test simulation information; select a modeling algorithm according to the network modeling input and the original information of the network modeling, and construct an algorithm package and an input data set; generate a network model according to the algorithm package and the input data set; and perform a forwarding test on the simulated service test data flow on the network model.

With reference to the second aspect, in a fourth possible implementation manner, the request for visualized network operation and maintenance is a fault location request, and the fault location request includes faulty service description information and faulty network description information; and the generating and creating module is specifically configured to generate, according to the faulty service description information and the faulty network description information, a workflow file for visualized network operation and maintenance or a message flow based on a specified protocol, where the workflow file or the message flow includes a path query constraint input, and is specifically configured to create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

With reference to the second aspect and the fourth possible implementation manner of the second aspect, in a fifth possible implementation manner, the analog simulation module is specifically configured to select a modeling algorithm according to the network modeling input and the original information of the network modeling, and construct an algorithm package and an input data set; generate a network model according to the algorithm package and the input data set; and extract, according to the path query constraint input, a device included in a specified network or a specified path and an event associated with the device, and screen and rate the event, to form an event report.

In the embodiments, a request for visualized network operation and maintenance is received; a workflow for visualized network operation and maintenance is generated according to the request for visualized network operation and maintenance, and a network modeling input is created; and analog simulation is performed, according to the workflow for visualized network operation and maintenance, the network modeling input, and original information of network modeling, on a network determined by the network modeling input. In this way, probe deployment costs and maintenance costs are reduced, and measurement extension upgrade is easier. A network is reconstructed and simulated by modeling, instead of a conventional mode in which detection and diagnosis are performed on a physical device, and actions such as path detection and fault diagnosis are performed on a level after the modeling, so that visualized network operation and maintenance is implemented without a probe, and forwarding in a physical network is not affected.

BRIEF DESCRIPTION OF THE DRAWINGS

FIG. 5-1 and FIG. 5-2 are a schematic diagram of an application scenario of network path visualization according to an embodiment;

DETAILED DESCRIPTION OF ILLUSTRATIVE EMBODIMENTS

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope.

The following describes the embodiments in further detail with reference to this specification.

Figure 1:
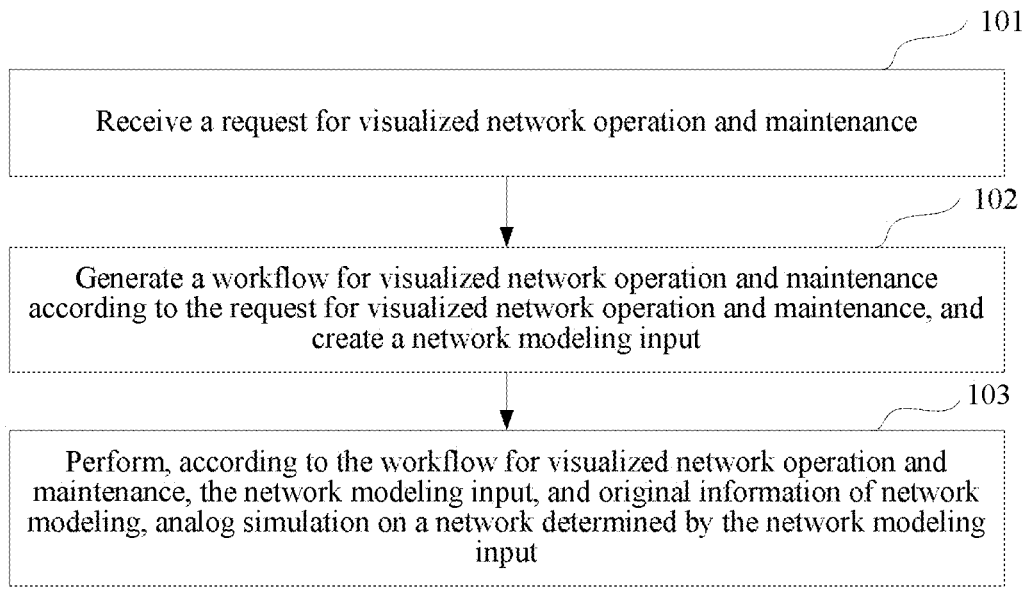
FIG. 1 is a flowchart of a method for visualized network operation and maintenance according to an embodiment.

An embodiment provides a method for visualized network operation and maintenance. Referring to FIG. 1, the method includes the following steps.

101: Receive a request for visualized network operation and maintenance.

102: Generate a workflow for visualized network operation and maintenance according to the request for visualized network operation and maintenance, and create a network modeling input.

103: Perform, according to the workflow for visualized network operation and maintenance, the network modeling input, and original information of network modeling, analog simulation on a network determined by the network modeling input.

According to the method in this embodiment, probe deployment costs and maintenance costs are reduced, and measurement extension upgrade is easier. A network is reconstructed and simulated by modeling, instead of a conventional mode in which detection and diagnosis are performed on a physical device, and actions such as path detection and fault diagnosis are performed on a level after the modeling, so that visualized network operation and maintenance is implemented without a probe, and forwarding in a physical network is not affected.

Optionally, the method for visualized network operation and maintenance is executed by an apparatus for visualized network operation and maintenance, which may be completed by one server, or may be jointly completed by multiple servers.

Optionally, the request for visualized network operation and maintenance is sent by any application or person using the apparatus for visualized network operation and maintenance to complete the method for visualized network operation and maintenance.

Optionally, the original information of the network modeling includes configuration information, acquired from an NMS, of a network element device in a region for visualized network operation and maintenance and includes status information acquired from the network element device in the region for visualized network operation and maintenance.

The configuration information includes but is not limited to at least one of network element geographical distribution information, physical information, logical information, capacity information, configuration information, forwarding policy information, or statistics information. The status information includes but is not limited to at least one of device port information, forwarding queue quantity and priority/queue depth information, device clock information, routing table entry change information, or status change information.

Optionally, in this embodiment, according to the configuration information, acquired from the NMS, of the network element device in the region for visualized network operation and maintenance and the status information acquired from the network element device in the region for visualized network operation and maintenance, restoration and modeling are performed as required for a network device of a specified network element that may be a physical or logical network, where the network device is in a specified region that may be a physical or logical region, and is within a specified time and a specified range, so that a third party can obtain a set of continuous network device statuses and status changes that are within the specified time and within the specified range, for example, continuous statuses of a forwarding port of a network element may be described as time points on a time axis, a curve of receiving and sending by the port, and a curve of a port status change. That is, in this embodiment, a defect of a forwarding test after fault location is also eliminated, for example, a delay or that a fault scenario cannot be reproduced. By means of network modeling based on sampling and restoration, various status events, especially a fault event, in a network, are discovered, so that determining of a network fault is more accurate, a backtracking capability is achieved to some extent, and an actual status of a network path is more accurately reflected. Being different from a current manner of instantaneous path measurement and acquiring, in this embodiment, query of a path within a particular time range is supported, and according to estimation of network traffic, a path within a future time period may also be presented.

Optionally, the request for visualized network operation and maintenance is a path visualization request, and the path visualization request includes path source and destination address information. The generating a workflow for visualized network operation and maintenance according to the request for visualized network operation and maintenance, and creating a network modeling input specifically includes: generating, according to the path source and destination address information, a workflow file for visualized network operation and maintenance or a message flow based on a specified protocol, where the workflow file or the message flow includes a path query constraint input; and creating the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

The performing, according to the workflow for visualized network operation and maintenance, the network modeling input, and original information of network modeling, analog simulation on a network determined by the network modeling input specifically includes analyzing a service test requirement according to the path query constraint input to obtain a simulation input, and generating service test simulation information; simulating a service test data flow according to the service test simulation information; selecting a modeling algorithm according to the network modeling input and the original information of the network modeling, and constructing an algorithm package and an input data set; generating a network model according to the algorithm package and the input data set; and performing a forwarding test on the simulated service test data flow on the network model.

Optionally, the request for visualized network operation and maintenance is a fault location request, and the fault location request includes faulty service description information and faulty network description information. The generating a workflow for visualized network operation and maintenance according to the request for visualized network operation and maintenance, and creating a network modeling input specifically includes: generating, according to the faulty service description information and the faulty network description information, a workflow file for visualized network operation and maintenance or a message flow based on a specified protocol, where the workflow file or the message flow includes a path query constraint input; and creating the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

The performing, according to the workflow for visualized network operation and maintenance, the network modeling input, and original information of network modeling, analog simulation on a network determined by the network modeling input specifically includes: selecting a modeling algorithm according to the network modeling input and the original information of the network modeling, and constructing an algorithm package and an input data set; generating a network model according to the algorithm package and the input data set; and extracting, according to the path query constraint input, a device included in a specified network or a specified path and an event associated with the device, and screening and rating the event, to form an event report.

Figure 2:
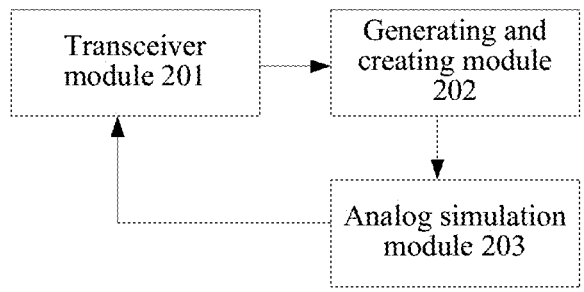
FIG. 2 is a schematic structural diagram of an apparatus for visualized network operation and maintenance according to an embodiment.

As shown in FIG. 2, an embodiment further provides an apparatus 200 for visualized network operation and maintenance, including a number of modules. A transceiver module 201 is configured to receive a request for visualized network operation and maintenance. A generating and creating module 202 is configured to generate a workflow for visualized network operation and maintenance according to the request for visualized network operation and maintenance, and create a network modeling input. An analog simulation module 203 is configured to perform, according to the workflow for visualized network operation and maintenance, the network modeling input, and original information of network modeling, analog simulation on a network determined by the network modeling input.

Figure 3:
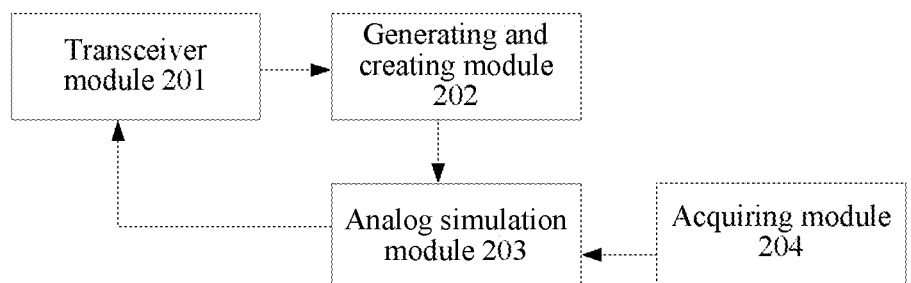
FIG. 3 is a schematic structural diagram of an apparatus for visualized network operation and maintenance according to an embodiment.

Optionally, as shown in FIG. 3, the apparatus further includes: an acquiring module 204, configured to acquire, from an NMS, configuration information of a network element device in a region for visualized network operation and maintenance and acquire status information from the network element device in the region for visualized network operation and maintenance, to form the original information of the network modeling.

Optionally, the request for visualized network operation and maintenance is a path visualization request, and the path visualization request includes path source and destination address information; and the generating and creating module 202 is specifically configured to generate, according to the path source and destination address information, a workflow file for visualized network operation and maintenance or a message flow based on a specified protocol, where the workflow file or the message flow includes a path query constraint input, and is specifically configured to create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

The analog simulation module 203 is specifically configured to analyze a service test requirement according to the path query constraint input to obtain a simulation input, and generate service test simulation information; simulate a service test data flow according to the service test simulation information; select a modeling algorithm according to the network modeling input and the original information of the network modeling, and construct an algorithm package and an input data set; generate a network model according to the algorithm package and the input data set; and perform a forwarding test on the simulated service test data flow on the network model.

Optionally, the request for visualized network operation and maintenance is a fault location request, and the fault location request includes faulty service description information and faulty network description information; and the generating and creating module 202 is specifically configured to generate, according to the faulty service description information and the faulty network description information, a workflow file for visualized network operation and maintenance or a message flow based on a specified protocol, where the workflow file or the message flow includes a path query constraint input, and is specifically configured to create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

The analog simulation module 203 is specifically configured to select a modeling algorithm according to the network modeling input and the original information of the network modeling, and construct an algorithm package and an input data set; generate a network model according to the algorithm package and the input data set; and extract, according to the path query constraint input, a device included in a specified network or a specified path and an even associated with the device, and screen and rate the event, to form an event report.

The apparatus for visualized network operation and maintenance in this embodiment is further described in the following with reference to FIG. 4.

Figure 4:
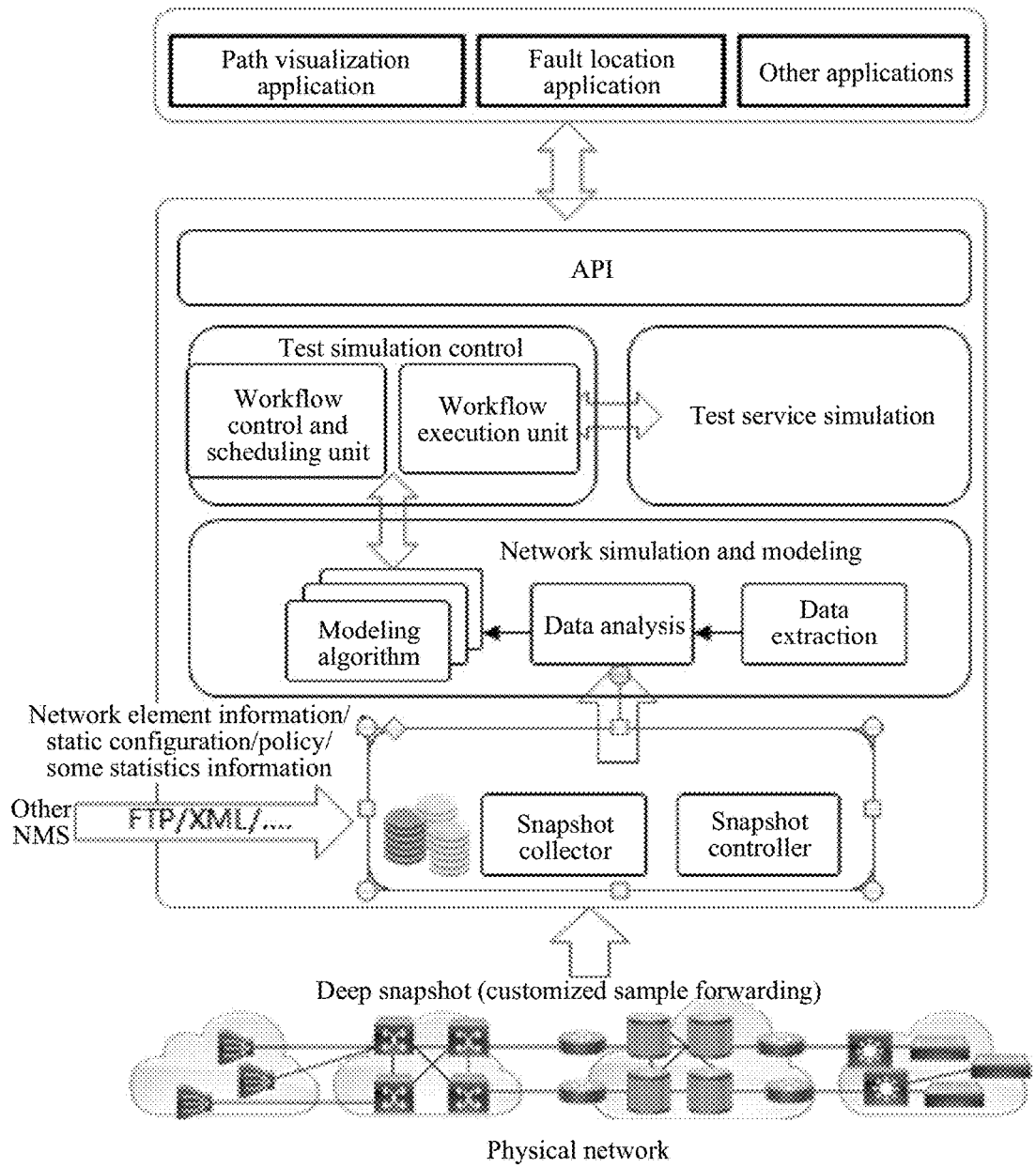
FIG. 4 is a schematic structural diagram of an apparatus for visualized network operation and maintenance according to an embodiment.

The transceiver module 201 of the apparatus for visualized network operation and maintenance in this embodiment may be an application programming interface (API) shown in FIG. 4, provides input and output interfaces for an application, such as a visualization application or a fault location application, receives a request from the application, and returns a response to the application.

The acquiring module 204 of the apparatus for visualized network operation and maintenance in this embodiment may be a network snapshot component shown in FIG. 4, and is configured to acquire, from a network element device and other NMSs, configuration information and status information of a network element device in a region for visualized network operation and maintenance in a particular manner, and perform class-based storage. The network snapshot component mainly formed by a snapshot controller and a snapshot collector. A core of the snapshot controller is to meet modeling and simulation requirements of an upper-layer network of the apparatus, and the snapshot controller performs scheduling and customization on an information acquiring task. The snapshot collector interfaces with a real physical network element device as required by the snapshot controller. An interfacing manner may be standardized, and reference may be made to various existing standardized network acquiring or measurement protocols, to acquire required status information.

The generating and creating module 202 and the analog simulation module 203 of the apparatus for visualized network operation and maintenance in this embodiment may specifically include: a test simulation control component, a test service simulation component, and a network simulation and modeling component shown in FIG. 4.

The test simulation control component is configured to generate a particular work task, for example, path visualization, fault location, or device status query, according to a request of an application, where the application may be a path visualization application, a fault location application, or other applications shown in FIG. 4; control a corresponding component to complete the specified task; and return a result to the application. The test simulation control component mainly includes a workflow control and scheduling unit and a workflow execution unit. The workflow control and scheduling unit generates a workflow task according to the request of the application, selects the workflow execution unit, acquires an execution result of the workflow task from the workflow execution unit, and finally returns the result to the application. The workflow execution unit is responsible for analyzing the workflow task, for example, determining a type of the workflow task, determining an execution step and action, and acquiring information from a related module or unit, executing the workflow task according to a requirement of the workflow task, and finally returning the result to the workflow control and scheduling unit.

The test service simulation component is configured to complete analyzing test service description according to a workflow definition to obtain a simulation input.

The network simulation and modeling component is configured to perform, according to network and network element device information collected by the network snapshot component, restoration and modeling as required for a network device of a specified network element that may be physical or logical, where the network device is in a specified region that may be physical or logical, and is within a specified time and a specified range, so that the application can acquire a set of continuous network device statuses and status changes that are within the specified time and within the specified range, for example, continuous statuses of a forwarding port of a network element may be described as time points on a time axis, a curve of receiving and sending by the port, and a curve of a port status change. The network simulation and modeling component may include units, such as a data extraction unit, a data analysis unit, and a modeling algorithm unit. The data extraction unit is configured to acquire a subset of sample data from the network snapshot component according to an input of the test simulation control component, for example, the workflow definition. The data analysis unit is configured to perform preliminarily analysis and classification according to an extracted data set, and output the data set in a manner that can be understood subsequently by the modeling algorithm unit, for example, an input format. The modeling algorithm unit is configured to execute a specified modeling algorithm, where each modeling algorithm can complete simulation from a dispersed data sample to continuous data according to a sample data input. Various behaviors and statuses of a specified network element device within a time period can be reconstructed on the modeling algorithm unit by combining apparatus statuses of the specified network element device and an input and output, after modeling algorithm simulation, of the network element device, to implement status restoration for the network element device.

Figures 1, 5:
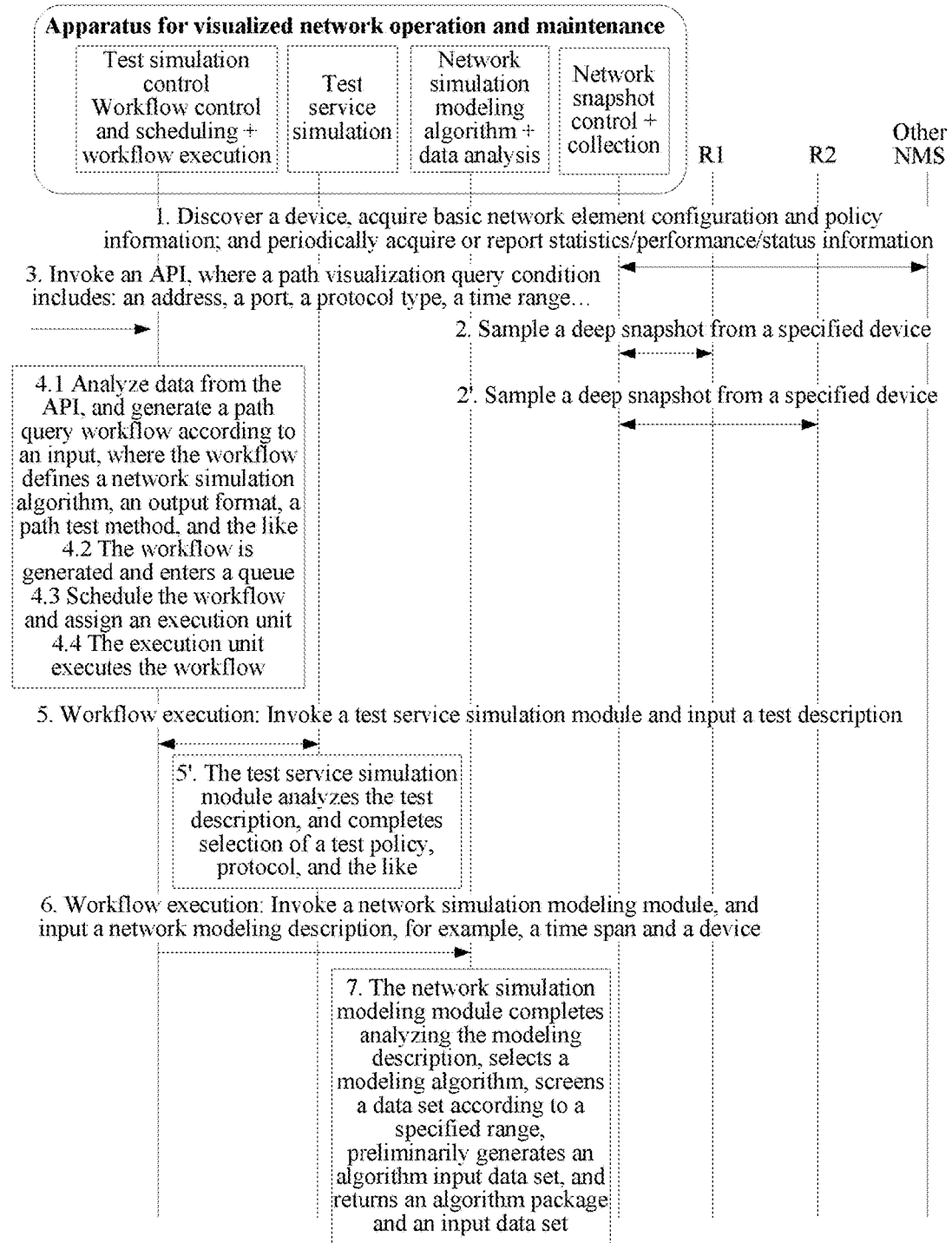
Figures 2, 5:
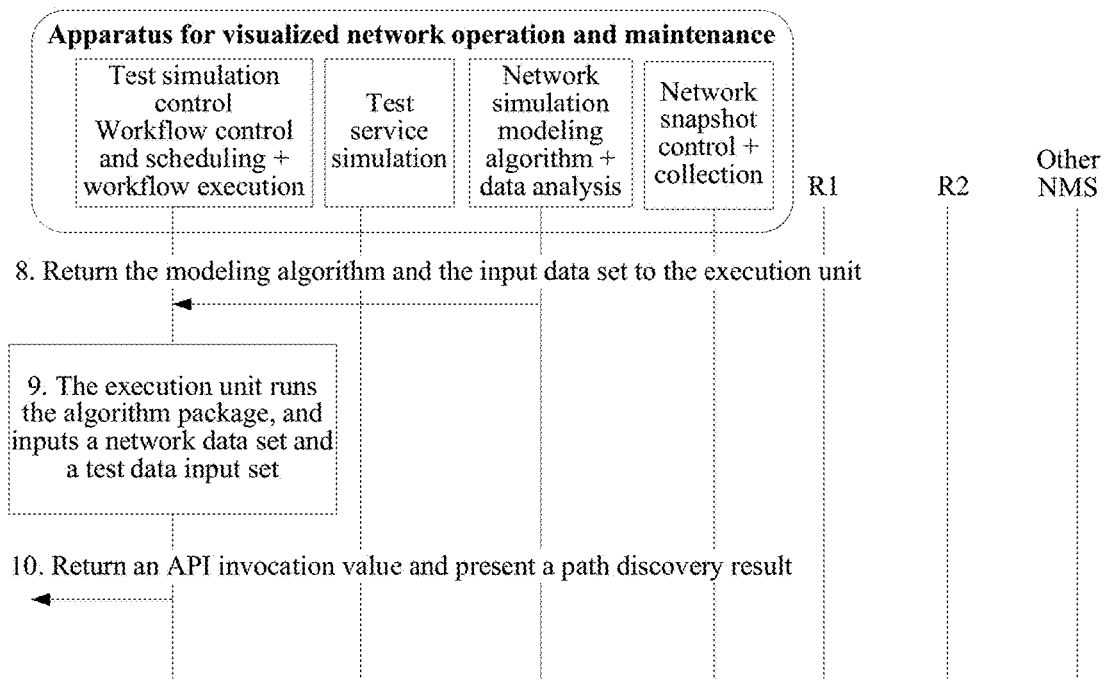

Using an application scenario of network path visualization and that the request for visualized network operation and maintenance is a path visualization request as an example, a method for visualized network operation and maintenance in an embodiment is provided in the following with reference to FIG. 5.

1) The network snapshot component of the apparatus for visualized network operation and maintenance acquires, from other NMSs, configuration information of network element devices, for example, R1 and R2, in a region for visualized network operation and maintenance, and completes discovery of a device that may be physical or logical and acquisition of a capability of a network element in the region for visualized network operation and maintenance, where an execution action is implemented in a mode that combines one-time acquisition and periodical acquisition.

2) The network snapshot component initiates an acquisition request to the network element devices, for example, R1 and R2, in the region for visualized network operation and maintenance, where an interface between the network snapshot component and the network element device may be a standard interface supported by the network element device, or may be a negotiated interface, and acquired data includes but is not limited to status information, such as device forwarding port information, forwarding queue quantity, priority, and queue depth information, device clock information, routing table entry change information, and status change information; and performs class-based storage on acquired information.

3) An application invokes an API of the apparatus for visualized network operation and maintenance, initiates a path visualization request to the test simulation control component of the apparatus for visualized network operation and maintenance, and waits for a request result returned by the apparatus for visualized network operation and maintenance, where the path visualization request includes path source and destination address information, or optionally, may include data flow port information, a data flow protocol type, a period within which a data flow occurs, and the like.

4) After the test simulation control component of the apparatus for visualized network operation and maintenance receives the path visualization request 1) The test simulation control component analyzes the path visualization request, and inputs, according to the request, a workflow file for constructing path visualization, where the workflow file may have multiple forms, for example, a batch processing command file, a script file, and a specified protocol format file, for example, XML or JSON; or certainly, the workflow file may be a series of messages based on a specified protocol, for example, an HTTP based message flow, which includes a path query constraint input, for example, an address, a port number, and a protocol type, or certainly may include a selected network modeling algorithm type, a path detection method in which for testing of a future forwarding path, ping or another protocol may be specified for use within a specified time and for determining of a previous service path, the definition may be neglected, an output data type, for example, whether a name of a network element through which the service path passes, a physical port or a port status, and the like is included, and an output format, for example, a topology diagram, a data set, or another predefined format.

2) After being generated, the workflow file enters a task queue of the workflow control and scheduling unit and waits to be processed.

3) After workflow scheduling starts, a unit is executed according to a workflow, which may be a physical or logical operation environment or a duty cycle of a server, and matching is performed for a support degree of a task type, and the workflow execution unit is finally assigned to send the workflow file to the workflow execution unit.

4) The workflow execution unit analyzes the workflow file, and executes the workflow according to a convention described in the file.

5) The workflow execution unit sends a service related work definition to the test service simulation component according to the convention; or when being placed locally in the execution unit as a component, a test service simulation functional module may be directly used in a software invoking manner. For example, to perform an Internet Control Message Protocol (ICMP) PING test, the workflow execution unit sends a basic requirement of the test to the test service simulation component; and the test service simulation component uses, according to the requirement of the test, a manner that can be understood by the workflow execution unit, to describe protocol information, such as packet encapsulation, carried content, a sending interval, and a quantity of sending times, and test policy information that are required by the ICMP PING test, and returns the protocol information and the test policy information to the workflow execution unit.

6) The workflow execution unit sends a network modeling related constraint to the network simulation and modeling component according to the convention, for example, a modeling algorithm type, a network element device requiring modeling, a time constraint, for example, a time range for modeling, for example, a time range from xx hour in the past to the current time, a hierarchy of modeling, functional modeling, where a basic function of a modeled network element needs to be simulated, for example, routing table query, a protocol, or a policy action, traffic modeling, where continuous forwarding traffic on a modeled device is restored, and upper-layer application support, for example, a basic application layer protocol that needs to be supported by the modeled network element, for example, HTTP, a dynamic event type, or a forwarding policy.

7) After receiving a modeling request sent by the workflow execution unit, the network simulation and modeling component analyzes the request, selects a modeling algorithm, screens a data set according to a range specified by the request, and preliminarily generates an algorithm input data set. According to different modeling requirements, an algorithm package may be constructed by using one or more modeling methods, and after the algorithm package runs according to a specific input and output by using a particular method, a specified network element device and a connection network of the specified network element device can be reconstructed and restored and a data set can be input.

8) The network simulation and modeling component returns the generated algorithm package and data set to the workflow execution unit.

9) The workflow execution unit stimulates a service test data flow according to service test simulation information returned in step 5), uses the algorithm package and the data set that are returned in steps 6) and 7) to generate a network model with a specified time, a specified network element device, and a specified type, and performs a forwarding test on the stimulated service test data flow on the network model.

10) The workflow execution unit constructs, by using a test result, a response according to a response structure invoked by the API, and finally returns the response to the application.

11) Path measurement ends.

Figure 6:
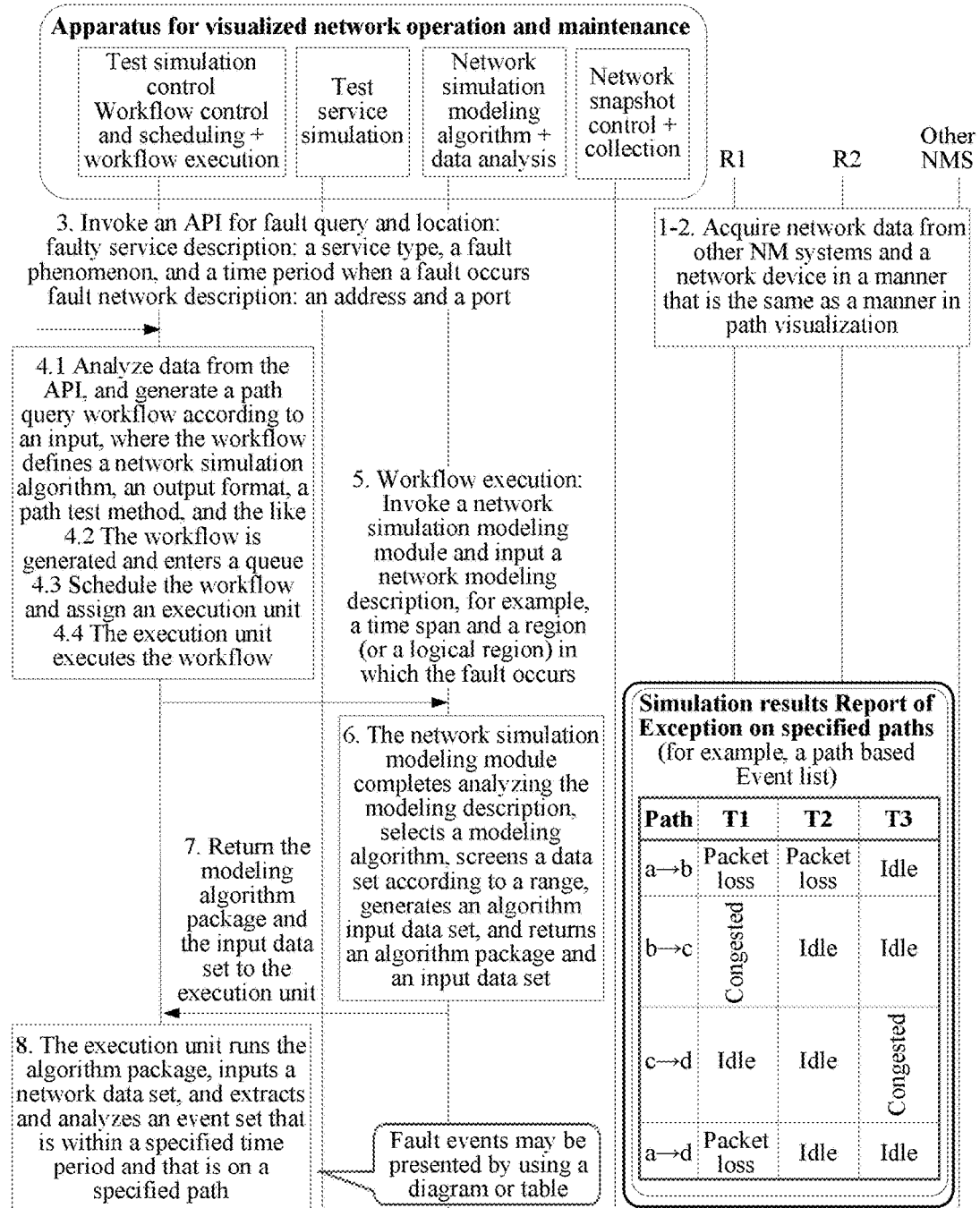
FIG. 6 is a schematic diagram of an application scenario of fault location according to an embodiment.

Using an application scenario of fault location and that the request for visualized network operation and maintenance is a fault location request as an example, a method for visualized network operation and maintenance in an embodiment is provided in the following with reference to FIG. 6.

1) The network snapshot component of the apparatus for visualized network operation and maintenance acquires, from other NMSs, configuration information of network element devices, for example, R1 and R2, in a region for visualized network operation and maintenance, and completes discovery of a device that may be physical or logical and acquisition of a capability of a network element in the region for visualized network operation and maintenance, where an execution action is implemented in a mode that combines one-time acquisition and periodical acquisition.

2) The network snapshot component initiates an acquisition request to the network element devices, for example, R1 and R2, in the region for visualized network operation and maintenance, where an interface between the network snapshot component and the network element device may be a standard interface supported by the network element device, or may be a negotiated interface, and acquired data includes but is not limited to status information, such as device forwarding port information, forwarding queue quantity, priority, and queue depth information, device clock information, routing table entry change information, and status change information; and performs class-based storage on acquired information.

3) An application invokes an API of the apparatus for visualized network operation and maintenance, initiates a fault location request to the test simulation control component of the apparatus for visualized network operation and maintenance, and waits for a query request result returned by the apparatus for visualized network operation and maintenance, where the fault location request includes but is not limited to the following information: faulty service description information and faulty network description information, where the faulty service description information is mainly information that describes a faulty service, for example, a service type, a fault phenomenon, and a time or time period when a fault occurs, and the faulty network description information mainly includes an access point at which the fault occurs, information about a possible fault address, for example, information including IP addresses of a client and a server, and port information.

4) After the test simulation control component of the apparatus for visualized network operation and maintenance receives the fault location request.

1) the test simulation control component analyzes the fault location request, and inputs, according to the request, a workflow file for constructing fault location, where the workflow file may have multiple forms, for example, a batch processing command file, a script file, and a specified protocol format file, for example, XML or JSON; or certainly, the workflow file may be a series of messages based on a specified protocol, for example, an HTTP based message flow, which includes a path query constraint input, for example, an address, a port number, and a protocol type, or certainly may include a selected network modeling algorithm type, a fault determining method in which for determining of a service fault that has occurred, key information focused for the fault may be specified, for example, a packet loss and delay and for a future possible fault prediction scenario, a possible condition for triggering a fault is mainly provided, for example, load of an xx port or an xx path exceeds 50% of that of a physical link, an output data type, for example, whether a name of an included network element, and a physical port or a port status, and the like is included, and an output format, for example, a device topology and attribute diagram, an event list, or another predefined format.

2) after being generated, the workflow file enters a task queue of the workflow control and scheduling unit and waits to be processed.

3) after workflow scheduling starts, a unit is executed according to a workflow, which may be a physical or logical operation environment or a duty cycle of a server, and matching is performed for a support degree of a task type, and the workflow execution unit is finally assigned to send the workflow file to the workflow execution unit.

4) the workflow execution unit analyzes the workflow file, and executes the workflow according to a convention described in the file.

5) The workflow execution unit sends a network modeling related constraint to the network simulation and modeling component according to the convention, for example, a modeling algorithm type, a network element device requiring modeling, a time constraint, for example, a time range for modeling, for example, a time range from xx hour in the past to the current time, a hierarchy of modeling, functional modeling, where a basic function of a modeled network element needs to be simulated, for example, routing table query, a protocol, or a policy action, a dynamic event type, where various events that affect forwarding and that occur on a modeled device are restored, for example, a routing table entry change, a port status change, a packet loss, a jitter, and a burst data flow, forwarding policy trigger, for example, an access control list (ACL) rule takes effect, traffic modeling, for example, continuous forwarding traffic on the modeled device is restored, and upper-layer application support, for example, a basic application layer protocol that needs to be supported by the modeled network element, for example, HTTP.

6) After receiving a modeling request sent by the workflow execution unit, the network simulation and modeling component analyzes the request, selects a modeling algorithm, screens a data set according to a range specified by the request, and preliminarily generates an algorithm input data set. According to different modeling requirements, an algorithm package may be constructed by using one or more modeling methods, and after the algorithm package runs according to a specific input and output by using a particular method, a specified network element and a connection network of the specified network element can be reconstructed and restored and a data set can be input.

7) The network simulation and modeling component returns the generated algorithm package and data set to the workflow execution unit.

8) The workflow execution unit uses the algorithm package and the data set that are returned in steps 6) and 7) to generate a network model with a specific time, a specific network element device, and a specific type, extracts a device that is within a specified range and that is on a specified path and an event related to the device, and screens and rates the event according to the fault key information specified in steps 3) and 4), to finally form an event report summary table shown in the figure, which may also be in another agreed form.

9) Fault location ends, and a result is provided.

Figure 7:
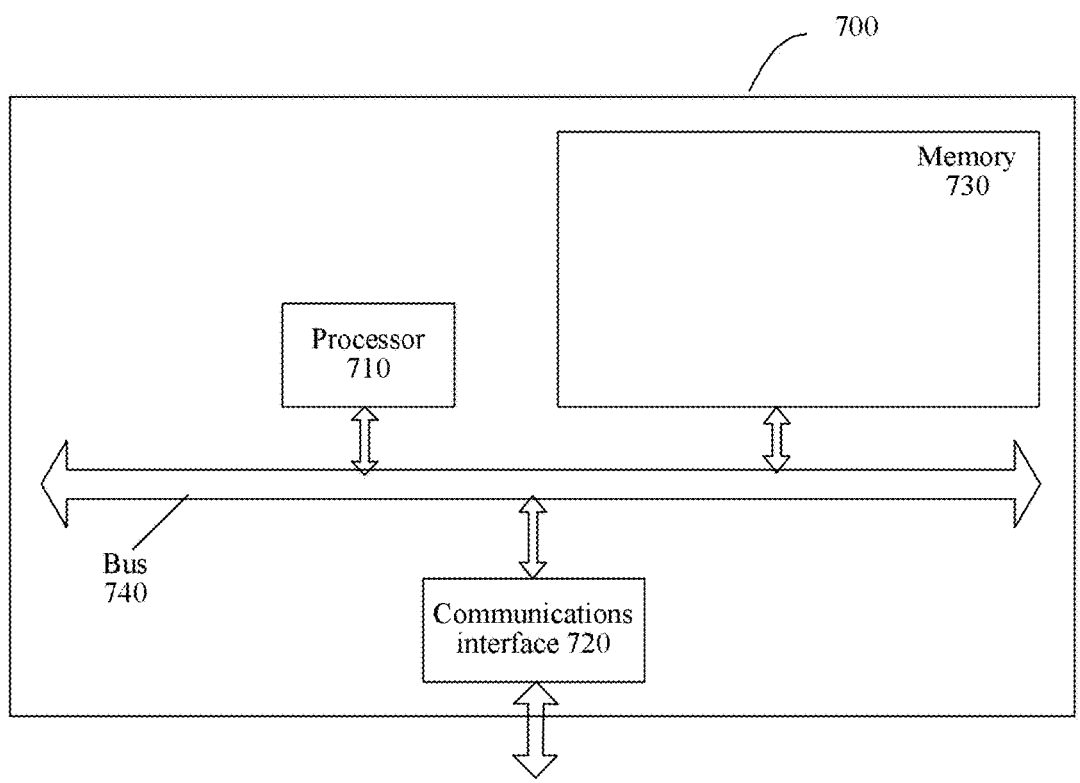
FIG. 7 is a schematic structural diagram of an apparatus for visualized network operation and maintenance according to an embodiment.

An embodiment further provides an apparatus 700 for visualized network operation and maintenance. Referring to FIG. 7, the apparatus 700 includes: a processor 710, a communications interface 720, a memory 730, and a bus 740. Communication among the processor 710, the communications interface 720, and the memory 730 is implemented by using the bus 740.

The communications interface 720 is configured to communicate with a network element, where the network element includes, for example, a virtual machine management center and a shared memory.

The processor 710 is configured to execute a program. The processor 710 may be a central processing unit (CPU) or an application specific integrated circuit (ASIC), or is configured as one or more integrated circuits that implement the embodiments.

The memory 730 is configured to store a file. The memory 730 may include a high-speed RAM memory, or may include a non-volatile memory, such as at least one magnetic disk memory. The memory 730 may also be a memory array. The memory 730 may also be partitioned into blocks, and the blocks may be combined into a virtual volume according to a particular rule.

In a possible implementation manner, the program may be program code including a computer operation instruction. The program is specifically configured to enable the apparatus 700 for visualized network operation and maintenance to execute the following steps: receiving a request for visualized network operation and maintenance; generating a workflow for visualized network operation and maintenance according to the request for visualized network operation and maintenance, and creating a network modeling input; and performing, according to the workflow for visualized network operation and maintenance, the network modeling input, and original information of network modeling, analog simulation on a network determined by the network modeling input.

In a possible implementation manner, the program is further configured to acquire, from an NMS, configuration information of a network element device in a region for visualized network operation and maintenance and acquire status information from the network element device in the region for visualized network operation and maintenance.

The request for visualized network operation and maintenance is a path visualization request, and the path visualization request includes path source and destination address information. In a possible implementation manner, the program is further configured to generate, according to the path source and destination address information, a workflow file for visualized network operation and maintenance or a message flow based on a specified protocol, where the workflow file or the message flow includes a path query constraint input; and create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

In a possible implementation manner, the program is further configured to analyze a service test requirement according to the path query constraint input to obtain a simulation input, and generate service test simulation information; simulate a service test data flow according to the service test simulation information; select a modeling algorithm according to the network modeling input and the original information of the network modeling, and construct an algorithm package and an input data set; generate a network model according to the algorithm package and the input data set; and perform a forwarding test on the simulated service test data flow on the network model.

The request for visualized network operation and maintenance is a fault location request, and the fault location request includes faulty service description information and faulty network description information. In a possible implementation manner, the program is further configured to generate, according to the faulty service description information and the faulty network description information, a workflow file for visualized network operation and maintenance or a message flow based on a specified protocol, where the workflow file or the message flow includes a path query constraint input; and create the network modeling input, where the network modeling input includes at least one of a modeling algorithm type, a network element device requiring modeling, a time constraint, a hierarchy of modeling, traffic modeling, upper-layer application support, a dynamic event type, or forwarding policy trigger.

In a possible implementation manner, the program is further configured to select a modeling algorithm according to the network modeling input and the original information of the network modeling, and construct an algorithm package and an input data set; generate a network model according to the algorithm package and the input data set; and extract, according to the path query constraint input, a device included in a specified network or a specified path and an event associated with the device, and screen and rate the event, to form an event report.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of embodiments.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. For example, the apparatus for visualized network operation and maintenance may be an independent device, or may be a distributed system. For example, the processor is replaced with a server, and the memory is replaced with a distributed file system.

When the functions are implemented in a form of a software functional unit and sold or used as an independent product, the functions may be stored in a computer-readable storage medium. Based on such an understanding, the technical solutions of embodiments essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the embodiments, but are not intended to limit the protection scope of embodiments. Any variation or replacement readily figured out by a person skilled in the art within the technical scope disclosed in embodiments shall fall within the protection scope of embodiments. Therefore, the protection scope of embodiments shall be subject to the protection scope of the claims.

What is claimed is:

1. A method comprising:
   receiving a request for visualized network operation and maintenance;
   generating a workflow for visualized network operation and maintenance according to the request for visualized network operation and maintenance, and creating a network modeling input; and
   performing, according to the workflow for visualized network operation and maintenance, the network modeling input, and original information of network modeling, analog simulation on a network determined by the network modeling input.

2. The method according to claim 1, wherein the original information of the network modeling comprises configuration information, acquired from a Network Management System (NMS), of a network element device in a region for visualized network operation and maintenance, and status information acquired from the network element device in the region for visualized network operation and maintenance.

3. The method according to claim 1, wherein the request for visualized network operation and maintenance is a path visualization request, and the path visualization request comprises path source and destination address information; and
   generating the workflow for visualized network operation and maintenance according to the request for visualized network operation and maintenance, and creating the network modeling input comprises:
   generating, according to the path source and destination address information, a workflow file for visualized network operation and maintenance; and
   creating the network modeling input, wherein the network modeling input comprises at least one of a modeling algorithm type, a network element device requiring modeling, a time constraint, a hierarchy of modeling, traffic modeling, upper-layer application support, a dynamic event type, or forwarding policy trigger.

4. The method according to claim 3, wherein performing, according to the workflow for visualized network operation and maintenance, the network modeling input, and the original information of network modeling, analog simulation on the network determined by the network modeling input comprises:
   analyzing a service test requirement according to a path query constraint input to obtain a simulation input, and generating service test simulation information;
   simulating a service test data flow according to the service test simulation information;
   selecting a modeling algorithm according to the network modeling input and the original information of the network modeling, and constructing an algorithm package and an input data set;
   generating a network model according to the algorithm package and the input data set; and
   performing a forwarding test on the simulated service test data flow on the network model.

5. The method according to claim 1, wherein the request for visualized network operation and maintenance is a path visualization request, and the path visualization request comprises path source and destination address information; and
   generating the workflow for visualized network operation and maintenance according to the request for visualized network operation and maintenance, and creating the network modeling input comprises:
   a message flow based on a specified protocol, wherein the message flow comprises a path query constraint input; and
   creating the network modeling input, wherein the network modeling input comprises at least one of a modeling algorithm type, a network element device requiring modeling, a time constraint, a hierarchy of modeling, traffic modeling, upper-layer application support, a dynamic event type, or forwarding policy trigger.

6. The method according to claim 1, wherein the request for visualized network operation and maintenance is a fault location request, and the fault location request comprises faulty service description information and faulty network description information; and
   the generating a workflow for visualized network operation and maintenance according to the request for visualized network operation and maintenance, and creating the network modeling input comprises:
   generating, according to the faulty service description information and the faulty network description information, a workflow file for visualized network operation and maintenance, wherein the workflow file comprises a path query constraint input; and
   creating the network modeling input, wherein the network modeling input comprises at least one of a modeling algorithm type, a network element device requiring modeling, a time constraint, a hierarchy of modeling, traffic modeling, upper-layer application support, a dynamic event type, and forwarding policy trigger.

7. The method according to claim 6, wherein performing, according to the workflow for visualized network operation and maintenance, the network modeling input, and the original information of network modeling, analog simulation on the network determined by the network modeling input comprises:
   selecting a modeling algorithm according to the network modeling input and the original information of the network modeling, and constructing an algorithm package and an input data set;
   generating a network model according to the algorithm package and the input data set; and
   extracting, according to the path query constraint input, a device in a specified network or a specified path and an event associated with the device, and screening and rating the event, to form an event report.

8. The method according to claim 1, wherein the request for visualized network operation and maintenance is a fault location request, and the fault location request comprises faulty service description information and faulty network description information; and
   the generating a workflow file for visualized network operation and maintenance according to the request for visualized network operation and maintenance, and creating the network modeling input comprises:
   generating, according to a message flow based on a specified protocol, wherein the workflow file or the message flow comprises a path query constraint input; and
   creating the network modeling input, wherein the network modeling input comprises at least one of a modeling algorithm type, a network element device requiring modeling, a time constraint, a hierarchy of modeling, traffic modeling, upper-layer application support, a dynamic event type, and forwarding policy trigger.

9. An apparatus comprising:
   a processor; and
   a non-transitory computer readable storage medium storing a programming for execution by the processor, the program including instructions to:
   receive a request for visualized network operation and maintenance;
   generate a workflow for visualized network operation and maintenance according to the request for visualized network operation and maintenance, and create a network modeling input; and
   perform, according to the workflow for visualized network operation and maintenance, the network modeling input, and original information of network modeling, analog simulation on a network determined by the network modeling input.

10. The apparatus according to claim 9, wherein the instructions further comprise instructions to acquire, from a Network Management System (NMS), configuration information of a network element device in a region for visualized network operation and maintenance and acquire status information from the network element device in the region for visualized network operation and maintenance, to form the original information of the network modeling.

11. The apparatus according to claim 9, wherein the request for the visualized network operation and maintenance is a path visualization request, and the path visualization request comprises path source and destination address information, and the instructions to generate the workflow for visualized network operation and maintenance comprise instructions to generate, according to the path source and destination address information, a workflow file for visualized network operation and maintenance, wherein the workflow file comprises a path query constraint input, and to create the network modeling input, wherein the network modeling input comprises at least one of a modeling algorithm type, a network element device requiring modeling, a time constraint, a hierarchy of modeling, traffic modeling, upper-layer application support, a dynamic event type, and a forwarding policy trigger.

12. The apparatus according to claim 9, wherein the request for the visualized network operation and maintenance is a path visualization request, and the path visualization request comprises path source and destination address information, and the instructions to generate the workflow for visualized network operation and maintenance comprise instructions to generate, according to the path source and destination address information, a message flow based on a specified protocol, wherein the message flow comprises a path query constraint input, and to create the network modeling input, wherein the network modeling input comprises at least one of a modeling algorithm type, a network element device requiring modeling, a time constraint, a hierarchy of modeling, traffic modeling, upper-layer application support, a dynamic event type, and a forwarding policy trigger.

13. The apparatus according to claim 12, wherein the instructions to perform the network modeling input, and the original information of network modeling, analog simulation comprise instructions to:
    analyze a service test requirement according to the path query constraint input to obtain a simulation input, and generate service test simulation information;
    simulate a service test data flow according to the service test simulation information;
    select a modeling algorithm according to the network modeling input and the original information of the network modeling, and construct an algorithm package and an input data set;
    generate a network model according to the algorithm package and the input data set; and
    perform a forwarding test on the simulated service test data flow on the network model.

14. The apparatus according to claim 9, wherein the request for visualized network operation and maintenance is a fault location request, and the fault location request comprises faulty service description information and faulty network description information, and the instructions to generate the workflow for visualized network operation and maintenance and create the network modeling input comprise instructions to generate, according to the faulty service description information and the faulty network description information, a workflow file for visualized network operation and maintenance, wherein the workflow file comprises a path query constraint input, and is specifically configured to create the network modeling input, wherein the network modeling input comprises at least one of a modeling algorithm type, a network element device requiring modeling, a time constraint, a hierarchy of modeling, traffic modeling, upper-layer application support, a dynamic event type, and forwarding policy trigger.

15. The apparatus according to claim 14, wherein the instructions to perform the network modeling input, and the original information of network modeling, analog simulation comprise instructions to select a modeling algorithm according to the network modeling input and the original information of the network modeling, and construct an algorithm package and an input data set;
    generate a network model according to the algorithm package and the input data set; and
    extract, according to the path query constraint input, a device comprised in a specified network or a specified path and an event associated with the device, and screen and rate the event, to form an event report.

16. The apparatus according to claim 9, wherein the request for visualized network operation and maintenance is a fault location request, and the fault location request comprises faulty service description information and faulty network description information, and the instructions to generate the workflow for visualized network operation and maintenance and create the network modeling input comprise instructions to generate, according to the faulty service description information and the faulty network description information a message flow, wherein the message flow comprises a path query constraint input, and is specifically configured to create the network modeling input, wherein the network modeling input comprises at least one of a modeling algorithm type, a network element device requiring modeling, a time constraint, a hierarchy of modeling, traffic modeling, upper-layer application support, a dynamic event type, and forwarding policy trigger.

17. A computer program product comprising a non-transitory computer readable storage medium storing a program for execution by a processor, the program including instructions to:
    receive a request for visualized network operation and maintenance;
    generate a workflow for visualized network operation and maintenance according to the request for visualized network operation and maintenance, and create a network modeling input; and
    perform, according to the workflow for visualized network operation and maintenance, the network modeling input, and original information of network modeling, analog simulation on a network determined by the network modeling input.

18. The computer program product according to claim 17, wherein the instructions further comprise instructions to acquire, from a Network Management System (NMS), configuration information of a network element device in a region for visualized network operation and maintenance and acquire status information from the network element device in the region for visualized network operation and maintenance, to form the original information of the network modeling.

* * * * *